US006760296B1

(12) United States Patent
Baba et al.

(10) Patent No.: US 6,760,296 B1
(45) Date of Patent: Jul. 6, 2004

(54) OPTICAL INTEGRATED DEVICE, OPTICAL PICKUP AND OPTICAL DISK APPARATUS

(75) Inventors: Tomohiko Baba, Chiba (JP); Katsutoshi Sato, Tokyo (JP); Satoshi Nakano, Tokyo (JP); Satoshi Imai, Tokyo (JP); Hiroaki Yukawa, Tokyo (JP)

(73) Assignee: Sony Corporation (JP)

( * ) Notice: Subject to any disclaimer, the term of this patent is extended or adjusted under 35 U.S.C. 154(b) by 580 days.

(21) Appl. No.: 09/599,535

(22) Filed: Jun. 23, 2000

(30) Foreign Application Priority Data

Jun. 24, 1999 (JP) .......................................... P11-178399

(51) Int. Cl.[7] ................................................ G11B 7/00
(52) U.S. Cl. ................................ 369/112.05; 369/112.1
(58) Field of Search .......................... 369/44.11, 44.12, 369/44.14, 44.23, 44.37, 44.41, 112.03, 112.04, 112.05, 112.07, 112.1, 112.15, 112.09

(56) References Cited

U.S. PATENT DOCUMENTS

| 5,621,716 | A | * | 4/1997 | Kojima et al. | ......... 369/112.07 |
| 5,982,732 | A | * | 11/1999 | Yamanaka | ............. 369/112.15 |
| 6,240,053 | B1 | * | 5/2001 | Akiyama | ................. 369/44.23 |
| 6,272,098 | B1 | * | 8/2001 | Takahashi et al. | ..... 369/112.17 |

* cited by examiner

Primary Examiner—Thang V. Tran
Assistant Examiner—Bach Vuong
(74) Attorney, Agent, or Firm—Rader, Fishman & Grauer PLLC; Ronald P. Kananen

(57) ABSTRACT

The disclosed invention relates to an optical integrated device, an optical pickup, and an optical disk apparatus, and is applicable to an optical disk apparatus for playing back a compact disk (CD) and a DVD (Digital Video Disk), thereby to access a plurality of types of optical disks with a simple arrangement. For dividing feedback light with a hologram 19A and detecting the divided feedback light with a light-detecting element 20, laser sources 15A, 15B having different wavelengths are spaced a predetermined distance D from each other in order to compensate for the difference between the diffraction angles $\theta A_1$, $\theta B$ of the hologram 19A.

21 Claims, 3 Drawing Sheets

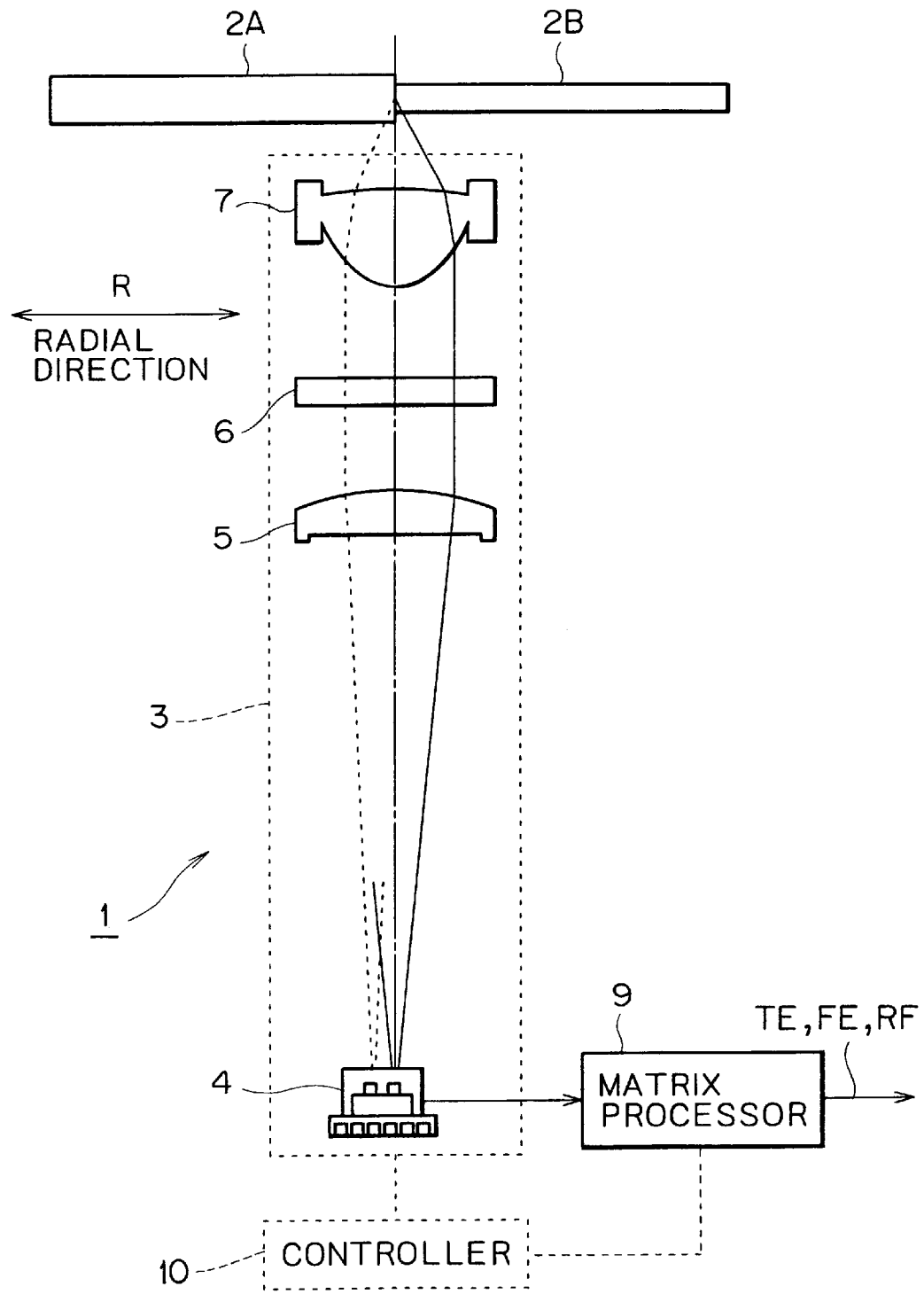

OPTICAL INTEGRATED DEVICE, OPTICAL PICKUP AND OPTICAL DISK APPARATUS

BACKGROUND OF THE INVENTION

1. Field of the Invention

The present invention relates to an optical integrated device, an optical pickup, and an optical disk apparatus, and is applicable to an optical disk apparatus for playing back a compact disk and a DVD (Digital Video Disk). The present invention resides in dividing feedback light with a diffraction grating and detecting the divided feedback light with a light-detecting element. Laser beam sources having different wavelengths are spaced a predetermined distance from each other in order to make up for the difference between diffraction angles of the diffraction grating thereby enabling access to a plurality of types of optical disks with a simple arrangement.

2. Brief Description of the Related Art

Conventional compact disk players as optical disk apparatus have an optical pickup which applies a laser beam to the information-recorded surface of a compact disk and processes detected feedback light of the applied laser beam for thereby reproducing various types of data recorded on the compact disk.

Optical pickups for such compact disk players are classified into a group in which a light-emitting element and a light-detecting element are disposed independently of each other, and another group in which a light-emitting element and a light-detecting element are integrally combined with each other. The optical pickups of the latter group are smaller in size and more reliable than the optical pickups of the former group.

Optical disk apparatus for playing back DVDs may be reduced in size and simplified in structure if their optical pickup is constructed using an optical integrated device. It is considered highly convenient if such optical disk apparatus for playing back DVDs are capable of playing back compact disks.

In such an application, if a light-emitting element and a light-detecting element for DVDs and a light-emitting element and a light-detecting element for compact disks are integrally combined into an optical integrated device, then an optical disk apparatus can be constructed which is capable of playing back both compact disks and DVDs.

However, when the light-emitting elements and the light-detecting elements are integrated respectively for DVDs and compact disks, the optical integrated device tends to be complex in structure. The present invention has been made in view of the above shortcomings of the prior art, and provides an optical integrated device, an optical pickup, and an optical disk apparatus which are capable of accessing a plurality of types of optical disks with a simple arrangement.

BRIEF SUMMARY OF THE INVENTION

It is an overall object of this invention therefore to provide an optical disk apparatus of the type described that is capable of accessing a plurality of types of optical disks with an uncomplicated arrangement.

To solve the above problems, the invention is applied to an optical integrated device, an optical pickup, or an optical disk apparatus. The optical integrated device comprises a first laser beam source for emitting a first laser beam having a first wavelength, a second laser beam source spaced a predetermined distance from the first laser beam source, for emitting a second laser beam having a second wavelength different from the first wavelength, a diffraction grating for dividing each of the feedback light corresponding to the first laser beam and the feedback light corresponding to the second laser beam into a plurality of rays, and a light-detecting element for commonly detecting the feedback light corresponding to the first laser beam and the feedback light corresponding to the second laser beam, with respect to at least a certain one of the rays divided by the diffraction grating.

According to the invention, the second laser beam source is spaced a predetermined distance from the first laser beam source, and the distance may be selected to divide the feedback light into a plurality of rays with the diffraction grating and detect feedback light corresponding to the first laser beam and feedback light corresponding to the second laser beam with the common light-detecting element, so that the overall structure can be simplified.

BRIEF DESCRIPTION OF THE DRAWINGS

FIG. 1 is a schematic view of an optical system of the optical disk apparatus according to the embodiment of the invention.

BRIEF DESCRIPTION OF THE PREFERRED EMBODIMENT

Figure 2A:
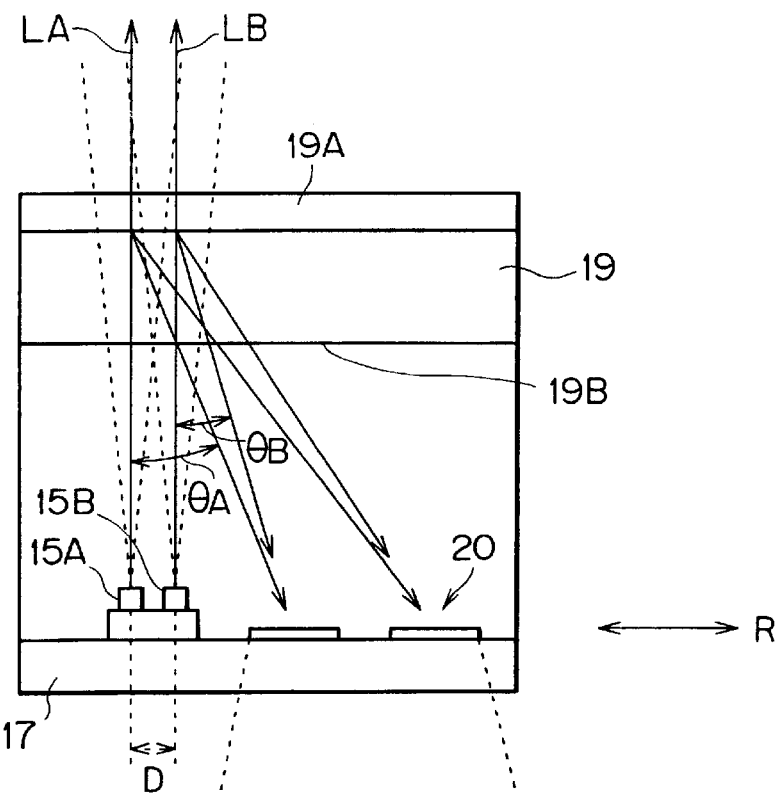
FIG. 2(A) is a cross-sectional view of an optical integrated device in an optical disk apparatus according to an embodiment of the invention.

Embodiments of the present invention will be described below with reference to the drawings.

FIG. 1 is a schematic view of an optical system of an optical disk apparatus according to an embodiment of the present invention. The optical disk apparatus 1 plays back data recorded on an optical disk 2B as a DVD and data recorded on an optical disk 2A as a compact disk.

The compact disk 2A is an optical disk comprising a transparent plate having a thickness of 1.2 mm where recorded data can be reproduced by processing feedback light produced when a laser beam is applied to an information-recorded surface of the optical disk through the transparent plate. The DVD 2B is an optical disk comprising a transparent plate having a thickness of 0.6 mm where recorded data can be reproduced by processing feedback light produced when a laser beam is applied to an information-recorded surface of the optical disk through the transparent plate.

The optical disk apparatus 1 has an optical pickup 3 positioned so as to be movable radially of the optical disk by a typical sled mechanism. The optical pickup 3 operates by applying a laser beam emitted from an optical integrated device 4 through a collimator lens 5, an aperture 6, and an objective lens 7 to the optical disk 2A or 2B and applying feedback light coming from the optical disk 2A or 2B through the objective lens 7, the aperture 6, and the collimator lens 5 to the optical integrated device 4.

The optical disk apparatus 1 processes the feedback light detected by the optical integrated device 4 to generate various signals required to play back the compact disk 2A and the DVD 2B. Based on a tracking error signal and a focus error signal among the generated signals, the optical disk apparatus 1 moves the objective lens 7 to effect tracking control and focusing control. The optical disk apparatus 1 processes a playback signal to reproduce data recorded on the optical disks 2A, 2B.

The optical integrated device 4 comprises a light-emitting element and a light-detecting element integrated into a single package, and is controlled by a system controller 10 to selectively emit a laser beam having a wavelength of 780 nm for use in playing back the compact disk 2A and a laser beam having a wavelength of 650 nm for use in playing back the DVD 2B. The optical integrated device 4 also detects feedback light produced upon application of the laser beam by the light-detecting element and outputs the detected feedback light.

The collimator lens 5 converts the laser beam emitted from the optical integrated device 4 into a substantially parallel beam, and emits the parallel beam.

The aperture 6 comprises a transparent plate having a dielectric film evaporated thereon with a central circular opening. The dielectric film surrounding the opening serves as a filter for selectively blocking light at 780 nm, which is the wavelength of the laser beam for the compact disk, and passing light at 650 nm, which is the wavelength of the laser beam for the DVD. The aperture 6 shapes and passes the laser beam for the compact disk according to a beam diameter determined by the opening, and passes the laser beam for the DVD without shaping its beam configuration.

The objective lens 7 comprises an aspheric plastic lens that has been injection-molded of a transparent synthetic resin. By selecting the refractive index of the transparent synthetic resin and the shapes of the lens surfaces, the objective lens 7 is capable of focusing the laser beam for the compact disk and the laser beam for the DVD, each applied as a parallel beam, onto the respective information-recorded surfaces of the corresponding optical disks 2A, 2B. The objective lens 7 thus serves as a bifocal lens for the laser beam for the compact disk and the laser beam for the DVD.

The objective lens 7 is movable radially of the optical disks 2A, 2B by a tracking control actuator which comprises a voice-coil motor. The tracking control is performed by energizing the tracking control actuator based on the tracking error signal. The objective lens 7 can also be moved along the optical axis of the laser beams by a similar actuator. The focusing control can be performed by energizing this actuator based on the focus error signal.

A matrix processor 9 effects matrix processing on the detected feedback light outputted from the optical integrated device 4 to generate a tracking error signal TE whose signal level varies depending on the tracking error, a focus error signal FE whose signal level varies depending on the focus error, and a playback signal RF whose signal level varies depending on the bit train.

Figure 2B:
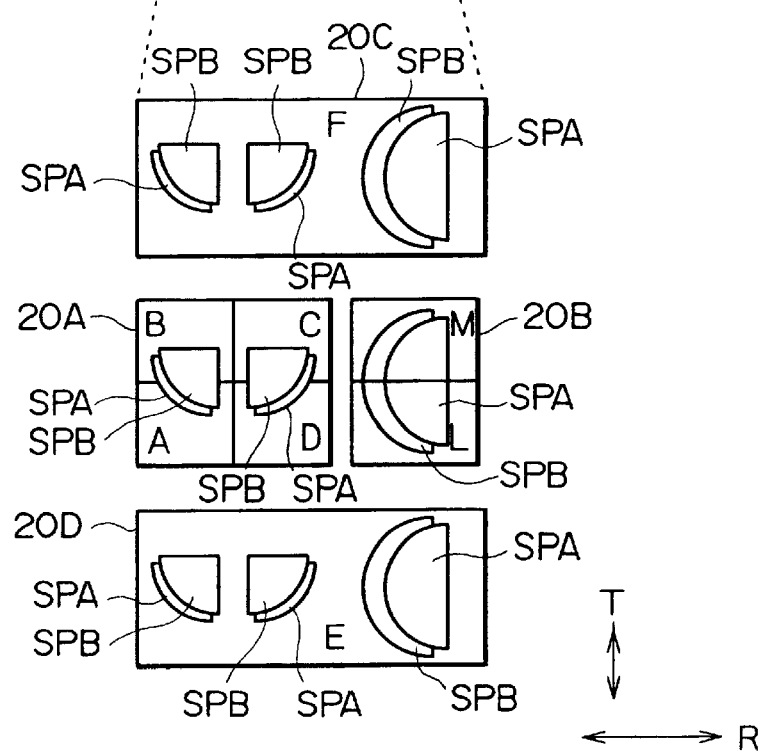
FIG. 2(B) is a plan view of a light-detecting element in the embodiment of FIG. 2(A)

FIG. 2(A) is a cross-sectional view of the optical integrated device 4 taken along the radial direction of the optical disks 2A, 2B, and FIG. 2(B) is a plan view of the light-detecting element of the optical integrated device. The optical integrated device 4 comprises semiconductor laser diode chips 15A, 15B mounted on a semiconductor substrate 17. After the semiconductor substrate 17 is housed in a package and interconnections are made to the semiconductor substrate 17, the assembly is sealed by lid glass 19 as a transparent sealing member into the optical integrated device 4.

A light-detecting element 20 is mounted on the semiconductor substrate 17. In the optical integrated device 4, the semiconductor laser diode chips 15A, 15B and the light-detecting element 20 are juxtaposed in the radial direction of the optical disks 2A, 2B.

A plan view of the light-detecting element of FIG. 2A is shown in FIG. 2B. The light-detecting element 20 has rectangular photodetector surfaces 20A, 20B juxtaposed in the radial direction (arrow R) of the optical disks 2A, 2B, and elongate rectangular photodetector surfaces 20C, 20D sandwiching the rectangular photodetector surfaces 20A, 20B therebetween and juxtaposed in a direction tangential (arrow T) to the optical disks 2A, 2B.

Of these photodetector surfaces 20A to 20D, the rectangular photodetector surface 20A positioned closely to the semiconductor laser diode chips is divided into four cross-partitioned square photodetector surfaces A to D by parting lines extending in the radial (arrow R) and tangential (arrow T) directions of the optical disks 2A, 2B. The rectangular photodetector surface 20A can output detected signals from the respective photodetector surfaces A to D.

The rectangular photodetector surface 20B next to the rectangular photodetector surface 20A is divided into two rectangular photodetector surfaces L, M by a parting line extending in the radial direction of the optical disks 2A, 2B. The rectangular photodetector surface 20B can output detected signals from the respective photodetector surfaces L, M.

The lid glass 19 includes a hologram 19A and a diffraction gating 19B as a diffraction grating means. The diffraction grating 19B is provided on one surface of the lid glass 19 so as to be opposite to the semiconductor laser diode chips 15A, 15B and diffracts laser beams LA and LB emitted toward the optical disks 2A, 2B and divides the laser beams LA and LB into 0, −1 and +1 orders of diffraction lights. The hologram 19A is provided on the other surface of the lid glass 19, and diffracts feedback light returned from the optical disks 2A, 2B to the photodetector surfaces 20A to 20D. The optical integrated device 4 applies the rays, which are diffracted by the diffraction grating 19B, to the optical disks 2A, 2B. The light-detecting element 20 detects the rays, which are diffracted by the hologram 19A, with the photodetector surfaces 20A to 20D.

Figure 2C:
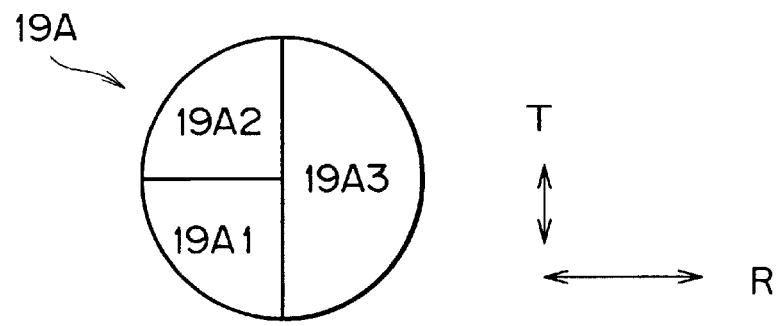
FIG. 2(C) shows a pattern of hologram.

FIG. 2(C) is a pattern view of the hologram 19A. The hologram 19A comprises a first area 19A1, a second area 19A2 and a third area 19A3, having formed therein holographic gratings different in grating constant from each other, respectively. The feedback light of the laser beams LA and LB incident upon the hologram 19A are diffracted at different angles, respectively, depending upon the grating constants of the holographic areas upon which the feedback light is incident, respectively.

Figure 2D:
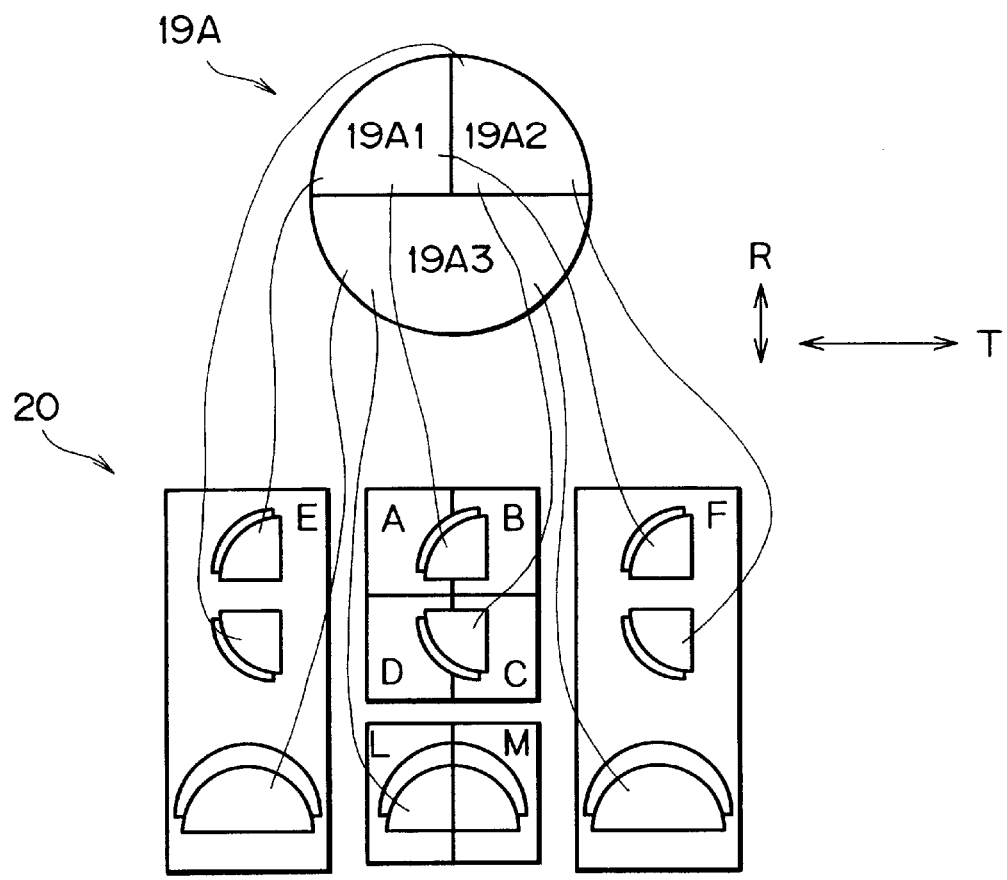
FIG. 2(D) shows a relationship between FIGS. 2(B) and 2(C).

FIG. 2(D) shows a relationship between FIGS. 2(B) and 2(C). The 0-order feedback light incident on the first are 19A1 is diffracted so as to be received by the photodetector surface 20A, at positions near to the semiconductor laser diode chips 15A, 15B. The +1-order feedback light and the −1-order feedback light incident on the first area 19A1 are diffracted so as to be received by the photodetector surface 20E and 20F, at positions near to the semiconductor laser diode chips 15A, 15B. The 0-order feedback light incident on the second area 19A2 is diffracted so as to be received by the photodetector surface 20A, at positions farther from the semiconductor laser diode chips 15A, 15B. The +1-order feedback light and the −1-order feedback light incident on the second area 19A2 are diffracted so as to be received by the photodetector surface 20E and 20F, at positions near to the of the photodetector surface 20E and 20F. The 0-order feedback light incident on the third area 19A3 is diffracted so as to be received by the photodetector surface 20B. The +1-order feedback light and the −1-order feedback light incident on the third area 19A3 are diffracted so as to be received by the photodetector surface 20E and 20F, at positions farther from the semiconductor laser diode chips 15A, 15B.

Specifically, the laser beam LA for the CD 2A will be described below. When the optical integrated device 4 emits the laser beam LA to the optical disk 2A, the diffraction grating 19B divides the laser beam LA into 0, −1, and +1 orders of diffraction light, and emits the 0, −1, and +1 orders of diffraction light. The hologram 19A applies feedback light of the 0-order diffraction light of those 0, −1, and +1 orders of diffraction light, to the photodetector surface 20A and 20B such that the feedback light of the 0-order diffraction light forms a beam spot SPA substantially centrally on the surfaces of the photodetectors 20A and 20B. The photodetectors 20A and 20B generate a playback signal (A+B+C+D+L+M) whose signal level varies depending on the bit train. The hologram 19A focuses the −1-order diffraction light and the +1-order diffraction light respectively on the photodetector surfaces 20C, 20D that are positioned one on each side of the surfaces of the photodetectors 20A and 20B. The photodetectors 20C and 20D generate a tracking error signal according to a three-beam method (E-F). The photodetector 20A generates a focus error signal according to the Foucault method, i.e. (A+D)−(B+C).

Also, the laser beam LB for the DVD 2B will be described below. When the optical integrated device 4 emits the laser beam LB to the optical disc 2B, the diffraction grating 19B divides the laser beam LB into 0, −1, and +1 orders of diffraction light, and emits the 0, −1, and +1 orders of diffraction light. The hologram 19A applies feedback light of the 0-order diffraction light, of those 0, −1, and +1 orders of diffraction light, to the photodetector surface 20A and 20B such that the feedback light of the 0-order diffraction light forms a beam spot SPB at substantially the same position of the beam spot SPA on the photodetector surfaces 20A. The photodetectors 20A and 20B generate a playback signal (A+B+C+D+L+M) whose signal level varies depending on the bit train. Then, the photodetector 20A and 20B generates a tracking error signal according to the DPD (Differential Phase Detection) method.

The hologram 19A focuses the −1-order diffraction light and the +1-order diffraction light respectively on the photodetector surfaces 20C, 20D that are positioned one on each side of the photodetector surface 20A. However, the photodetectors 20C and 20D are not used for the optical disk 2B. The photodetector 20B generates a focus error signal according to the Foucault method, i.e. (A+D)−(B+C).

In the optical integrated device 4, the semiconductor laser diode chips 15A, 15B are arranged such that the beam spot SPB of the laser beam LB for the DVD and the beam spot SPA of the laser beam LA for the compact disk have their centers aligned with each other on the four-segment photodetector surface 20A. The diffraction angle θ of the feedback light emitted from the hologram 19A, the wavelength λ of the feedback light, and the repetition pitch p of the hologram 19A are basically related to each other according to the following equation:

$$\lambda = p \times \sin\theta \quad (1)$$

For example, if the repetition pitch p of the hologram 19A is 4 μm, then the diffraction angle θA of the feedback light of the laser beam LA having the wavelength of 780 nm used to play back the compact disk 2A is 11.24 degrees, whereas the diffraction angle θA of the feedback light of the laser beam LB having the wavelength of 650 nm used to play back the DVD 2B is 9.35 degrees.

In the optical integrated device 4, the semiconductor laser diode chip 15A for the compact disk where the diffraction angles θA, θB are larger is located farther from the photodetector surface 20A, and a light emission spot of the semiconductor laser diode chip 15A for the compact disk and a light emission spot of the semiconductor laser diode chip 15B for the DVD are spaced from each other by a given distance D. In the optical integrated device 4, even though the diffraction angles θA, θB are different from each other, the distance D is selected such that the beam spot SPB of the feedback light of the laser beam LB for the DVD and the beam spot SPA of the feedback light of the laser beam LA for the compact disk have their centers substantially aligned with each other on the four-segment photodetector surface 20A.

Though the distance D varies depending on the distance from the photodetector surface of the light-detecting element 20, the design of the hologram 19A, and so forth, the distance D has a practical range from 10 μm to 500 μm.

In the light-detecting element 20, as indicated by beam spots SPA of the feedback light of the laser beam LA, the feedback light of the laser beam LA is focused on the photodetector surfaces 20B to 20D, other than the photodetector surface 20A, at positions farther from the semiconductor laser diode chips 15A, 15B and the photodetector surface 20A than focused positions of the feedback light of the laser beam LB for the DVD 2B. In the light-detecting element 20, the photodetector surfaces 20C, 20D and the remaining rectangular photodetector surface 20B are formed so as to be capable of detecting the beam spots SPA focused at positions farther than the focused beam spots SPB of the laser beam LB for the DVD 2B. With this arrangement, when the compact disk 2A is accessed using the light-detecting element commonly used for accessing the DVD 2B, a tracking error signal can be generated according to the push-pull method instead of the DPD method.

For playing back the DVD 2B, the matrix processor 9 (FIG. 1) converts currents detected by the four-segment photodetector surface 20A into voltages, and compares the phases of the converted voltages from the photodetector surfaces A+B closer to the semiconductor laser diode chips with each other and the photodetector surfaces C+D farther from the semiconductor laser diode chips with each other. Furthermore, the matrix processor converts currents detected by the two-segment photodetector surface 20B into voltages, and compares the phases of the converted voltages from the photodetector surfaces L and M. The matrix processor 9 then generates a differential signal from the compared phases to generate a tracking error signal TE according to the DPD method.

The converted voltages from the photodetector surface 20A are added to generate a playback signal RF represented by A+B+C+D using the photodetector surfaces A to D, and similarly to generate a focus error signal FE represented by (A+D)−(B+C).

For playing back the compact disk 2A, the matrix processor 9 generates a playback signal RF and a focus error signal FE in the same manner as for playing back the DVD 2B. The matrix processor 9 generates a differential signal from converted voltages from the photodetector surfaces F, E to generate a tracking error signal according to the three-beam method.

In the operation of the optical disk apparatus 1 (FIG. 1), the optical pickup 3 applies a laser beam to the optical disks 2A, 2B and detects feedback light. The signal processor processes the detected feedback light to reproduce information recorded on the optical disks 2A, 2B.

Specifically, the optical integrated device 4 in the optical pickup 3 emits a laser beam which is converted into an approximately parallel beam by the collimator lens 5. The laser beam then passes through the aperture 6 to the objective lens 7, which focuses the laser beam onto the information-recorded surfaces of the optical disks 2A, 2B. Feedback light produced when the laser beam is applied to the optical disks 2A, 2B is applied through the objective lens 7 to the optical integrated device 4, which detects the feedback light.

In the optical disk apparatus 1, a tracking error signal TE is generated from the detected feedback light. The objective lens 7 is moved in the radial direction of the optical disks 2A, 2B such that the tracking error signal TE has a predetermined signal level, for thereby performing tracking control. Similarly, a focus error signal FE is generated, and the objective lens 7 is moved in the vertical direction such that the focus error signal FE has a predetermined signal level, for thereby performing focus control.

In the above operation of the optical pickup, if the optical disk loaded in the optical disk apparatus 1 is the DVD 2B, then of the semiconductor laser diode chips 15A, 15B (FIG. 2(A)) juxtaposed in the radial direction (arrow R) of the optical disks 2A, 2B, the semiconductor laser diode chip 15B for the DVD selectively emits the laser beam LB, and the laser beam LB is divided by the diffraction grating 19B into three diffraction beams that are applied to the DVD 2B. Feedback light from the DVD 2B is divided by the hologram 19A into a plurality of rays that are detected by the light-detecting element 20.

The rays detected by the light-detecting element 20 are processed by the matrix processor 9 to generate a tracking error signal TE according to the DPD method, a focus error signal FE according to the Foucault method, and a playback signal RF whose signal level varies depending on the bit train on the DVD 2B. Various items of information recorded on the DVD 2B are reproduced based on the playback signal RF.

Conversely, if the compact disk 2A is loaded in the optical disk apparatus 1, then of the semiconductor laser diode chips 15A, 15B (FIG. 2(A)), the semiconductor laser diode chip 15A for the compact disk selectively emits the laser beam LA, and the laser beam LA is applied to the compact disk 2A as is the case with the DVD 2B. Feedback light from the compact disk 2A is detected by the common light-detecting element 20 used for detecting the feedback light from the DVD 2B.

For detecting the feedback light, the semiconductor laser diode chip 15A for the compact disk 2A is spaced from the light-detecting element 20 more remotely from the semiconductor laser diode chip 15B for the DVD 2B to bring the centers of the beam spots SPB, SPA for playing back the DVD 2B and the compact disk 2A, respectively, into substantial agreement with each other on the four-segment photodetector surface 20A while compensating for the difference between the diffraction angles θA, θB of the hologram 19A. This arrangement allows the single light-detecting element 20 to detect feedback light from the optical disks 2A, 2B which are of different types.

Specifically, the compact disk 2A and the DVD 2B are characterized in that the wavelengths of laser beams used to play back them are different from each other, and different methods are employed to generate a tracking error signal TE due to different pit depths.

In the optical disk apparatus 1, the optical integrated device 4 is simplified in construction. The optical disk apparatus 1 is thus simplified in overall structure, and is capable of accessing optical disks of plural types.

There are significant advantages with the device according to the invention. With the above arrangement, laser sources having different wavelengths are spaced a predetermined distance from each other in order to compensate for the difference between the diffraction angles of a diffraction grating, so that feedback light produced by the laser sources having different wavelengths can be detected by a common light-emitting element. An optical integrated device, an optical pickup, and an optical disk apparatus can be simplified in construction and are capable of accessing optical disks of plural types.

In the above embodiment, the semiconductor laser diode chips 15A, 15B and the light-detecting element 20 are juxtaposed in the radial direction of the optical disks 2A, 2B. However, the semiconductor laser diode chips 15A, 15B and the light-detecting element 20 may be juxtaposed in a direction tangential to the optical disks.

In the above embodiment, the objective lens comprises a bifocal lens. The present invention is not limited to such a lens, but a dual-wavelength hologram may be formed on a surface of the objective lens to handle different wavelengths, or various other focusing means for focusing laser beams having different wavelengths may be employed.

In the above embodiment, a tracking error signal is generated according to the DPD method and the three-beam method, and a focus error signal is generated according to the Foucault method. The present invention is not limited to those methods, but various other methods may be employed to generate a tracking error signal and a focus error signal.

In the above embodiment, detected signals from the four-segment photodetector surface 20A are added to generate a playback signal. The present invention is not limited to such a process of generating a playback signal, but various other processes of generating a playback signal may be employed. For example, detected signals from the other photodetector surface 20B, etc. may be used to generate a playback signal, and detected signals from the other photodetector surface 20B, etc. and detected signals from the photodetector surface 20A may be added to generate a playback signal.

In the above embodiment, the semiconductor laser diode chips 15A, 15B are spaced at the distance D from each other on the semiconductor substrate 17. The present invention is not limited to such a structure, but a plurality of laser diodes having different wavelengths may be integrated on a single semiconductor chip. In this case, since the accuracy of the layout can be increased depending on the distance D, and hence the yield can be increased and the optical integrated device can be reduced in size.

In the above embodiment, the compact disk and the DVD are played back. The present invention is not limited to the playback of those disks, but may be applied to accessing the compact disk and the CD-R, for example.

In the above embodiment, accessing two types of optical disks has been described. The present invention is not limited to two types of optical disks, but may be applied to accessing a plurality of types of optical disks.

According to the present invention, as described above, for dividing feedback light with the diffraction grating and detecting the divided feedback light with the light-detecting element, the laser sources having different wavelengths are spaced a predetermined distance from each other in order to compensate for the difference between the diffraction angles of the diffraction grating. In this manner, the light-detecting element is used in common, and a plurality of types of optical disks can be accessed with a simple arrangement.

What is claimed is:

1. An optical integrated device for applying a first or second laser beam to a recording medium, detecting feedback light of said first or second laser beam from the recording medium, the optical integrated device comprising:
   a first laser beam source for emitting said first laser beam having a first wavelength;
   a second laser beam source spaced a predetermined distance from said first laser beam source, for emitting said second laser beam having a second wavelength different from said first wavelength;
   a sealing member for dividing each of said emitted first and second laser beams into a plurality of rays and diffracting said feedback light of said first or second laser beam; and
   a light-detecting element for commonly detecting said diffracted feedback light of said first or second laser beam, with respect to at least a certain one of the rays divided by said sealing member.

2. The optical integrated device according to claim 1, wherein said first and second laser beam sources are integrated on one semiconductor chip.

3. The optical integrated device according to claim 1, wherein said first and second wavelengths are 780 nm and 650 nm, respectively, and that said predetermined distance ranges from 10 $\mu$m to 500 $\mu$m.

4. The optical integrated device according to claim 1, wherein said sealing member comprises a hologram so that a diffraction angle is changed according to the wavelength of said laser beam.

5. The optical integrated device according to claim 1, wherein said light-detecting element has a plurality of photo-detector surfaces for receiving the plurality of rays.

6. The optical integrated device according to claim 1, wherein said first and second laser beam sources and said light-detecting element are mounted on a semiconductor substrate.

7. The optical integrated device according to claim 6, wherein said first laser beam source emits the first laser beam having a larger wavelength than the second laser beam emitted from the second laser beam source, and said first laser beam source is located farther from the light-detecting element.

8. An optical pickup device for applying a first or second laser beam to an optical disc and detecting feedback light of said laser beam, said optical pickup device comprising:
   laser beam focusing means for focusing the first or second laser beam to the optical disc;
   a first laser beam source for emitting said first laser beam having a first wavelength;
   a second laser beam source spaced a predetermined distance from said first laser beam source, for emitting said second laser beam having a second wavelength different from said first wavelength;
   a sealing member for dividing each of said emitted first and second laser beams into a plurality of rays and diffracting said feedback light of said first or second laser beam; and
   a light-detecting element for commonly detecting said feedback light corresponding to said first laser beam and said feedback light corresponding to said second laser beam, with respect to at least a certain one of the rays divided by said sealing member,
   wherein said first laser beam source, said second laser beam source, said sealing member, and said light-detecting element are incorporated into an integrated optical device.

9. The optical pickup device according to claim 8, wherein said first and second laser beam sources are integrated on one semiconductor chip of the optical integral device.

10. The optical pickup device according to claim 8, wherein said first and second wavelengths are 780 nm and 650 nm, respectively, and that said predetermined distance ranges from 10 $\mu$m to 500 $\mu$m.

11. The optical pickup device according to claim 8, wherein said sealing member comprises a hologram so that a diffraction angle is changed according to the wavelength of the first or second laser beam.

12. The optical pickup device according to claim 8, wherein said light-detecting element has a plurality of photo-detector surfaces for receiving the plurality of rays.

13. The optical pickup device according to claim 8, wherein said first and second laser beam sources and said light-detecting element are mounted on a semiconductor substrate, and are juxtaposed in the radial direction of the optical disc.

14. The optical pickup device according to claim 13, wherein said first laser beam source emits the first laser beam having a larger wavelength than the second laser beam emitted from the second laser beam source, and the first laser beam source is located farther from the light-detecting element.

15. An optical disc apparatus for recording data on and/or reproducing data from an optical disc, the optical disc apparatus comprising:
   laser beam focusing means for focusing a first or second laser beam to the optical disc;
   a first laser beam source for emitting said first laser beam having a first wavelength;
   a second laser beam source spaced a predetermined distance from said first laser beam source, for emitting said second laser beam having a second wavelength different from said first wavelength;
   a sealing member for dividing each of said emitted first and second laser beams into a plurality of rays and diffracting said feedback light of said first or second laser beam;
   a light-detecting element for commonly detecting said feedback light corresponding to said first laser beam and said feedback light corresponding to said second laser beam, with respect to at least a certain one of the rays divided by said sealing member; and
   a processor for generating an output signal based on the feedback light which received the light-detecting element,
   wherein said first and second layer beam sources said light detecting element, said sealing member, and said processor are incorporated into an integrated optical device.

16. The optical disc apparatus according to claims 15, wherein said first and second laser beam sources are integrated on a semiconductor chip of the integrated optical device.

17. The optical disc apparatus according to claim 15, wherein said first and second wavelengths are 780 nm and 650 nm, respectively, and said predetermined distance ranges from 10 $\mu$m to 500 $\mu$m.

18. The optical disc apparatus according to claim 15, wherein said sealing member comprises a hologram so that a diffraction angle is changed according to the wavelength of laser beam.

19. The optical disc apparatus according to claim 15, wherein said light-detecting element has a plurality of photo-detector surfaces for receiving the plurality of rays.

20. The optical disc apparatus according to claim 15, wherein said first and second laser beam sources and said light-detecting elements are mounted on a semiconductor substrate of the integrated optical device, which are juxtaposed in the radial direction of the optical disc.

21. The optical disc apparatus according to claim 20, wherein said first laser beam source emits the first laser beam having a longer wavelength than the second laser beam emitted from the second laser beam source, the first laser beam source is located farther from the light-detecting element.

* * * * *